United States Patent

[11] 3,620,898

| [72] | Inventors | Roland G. Harris<br>Chadds Ford, Pa.;<br>Joseph Henry Ryan, Jr., Claymont, Del. |
|---|---|---|
| [21] | Appl. No. | 788,157 |
| [22] | Filed | Dec. 31, 1968 |
| [45] | Patented | Nov. 16, 1971 |
| [73] | Assignee | E. I. du Pont de Nemours and Company<br>Wilmington, Del. |

[54] HEAT SHRINKABLE CUSHIONING MATERIAL
7 Claims, 1 Drawing Fig.

[52] U.S. Cl. .................................................. 161/160,
161/402, 156/244, 161/252, 5/337
[51] Int. Cl. ............................................. B32b 3/12
[50] Field of Search ............................................. 161/402,
160, 161, DIG. 6, 252; 5/337; 156/244

[56] References Cited
UNITED STATES PATENTS

| 3,181,765 | 5/1965 | Bonzagni et al. ............ | 229/3.5 |
| 3,249,570 | 5/1966 | Potts et al. .................... | 260/29.6 |
| 3,299,194 | 1/1967 | Golike........................... | 161/402 |
| 3,455,483 | 7/1969 | Inklaar ......................... | 220/71 |
| 3,227,784 | 1/1966 | Blades et al................... | 264/53 |

*Primary Examiner*—Morris Sussman
*Attorney*—Donald W. Huntley

ABSTRACT: A heat shrinkable foam laminate comprising a low density foam sheet bonded to at least one heat shrinkable film.

PATENTED NOV 16 1971 3,620,898
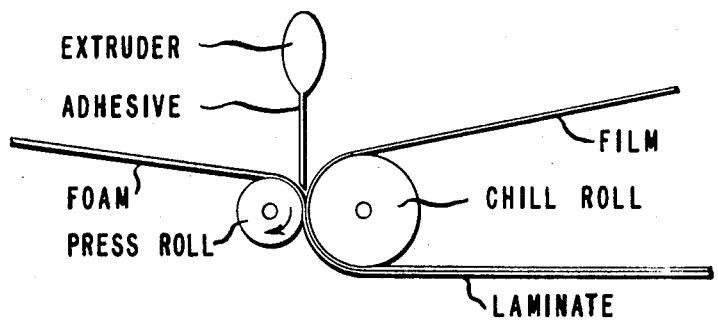
INVENTORS
ROLAND G. HARRIS
JOSEPH H. RYAN, JR.
BY Donald W. Huntley
ATTORNEY

HEAT SHRINKABLE CUSHIONING MATERIAL

BACKGROUND OF THE INVENTION

In the course of continuing efforts to provide more versatile cushioning and packaging materials, attempts have previously been made to prepare heat shrinkable foams or film-foam laminates. One such product is described, for example, in British Pat. No. 1,049,212 to Haveg Industries, which provides a stretched foamed thermoplastic polymer with at least one unfoamed skin.

While the advantages of such a product in wrapping fragile, irregularly shaped articles is readily apparent, an entirely satisfactory product has not previously been available. One of the difficulties most commonly encountered is delamination. A related problem is encountered with the products of the British patent, in which the unfoamed skin tends to expand when the structure is heated for purposes of either orientation or heat shrinking, thus destroying the desired skin/foam structural entity.

In situations where delamination is not a problem, foams used often fail to exhibit the flexibility required of a packaging material, or the cushioning properties of the foams are adversely effected by the heat-shrinking conditions.

SUMMARY OF THE INVENTION

This invention provides an improved heat shrinkable cushioning material which is readily adaptable to a variety of packaging operations. Specifically, the instant invention provides a laminar heat shrinkable cushioning structure which comprises (a) preformed foam sheet of thermoplastic crystalline polymer of film forming molecular weight having a work to break value of at least 10,000 in.-lbs./in.$^3$, the foam sheet consisting essentially of polyhedral shaped cells whose median diameter is at least 500 microns and having a maximum density of 0.03 g./cc. and (b) preformed heat shrinkable thermoplastic film adhesively bonded to at least one surface of the foam sheet.

BRIEF DESCRIPTION OF THE DRAWING

The FIGURE is a schematic illustration of an apparatus which can be used in the preparation of the laminates of the instant invention.

DESCRIPTION OF THE PREFERRED EMBODIMENTS

The foam sheet used in the instant invention can be made according to U.S. Pat. application Ser. No. 797,312 filed on Dec. 27, 1968 in the name of R. G. Parrish, which application is hereby incorporated by reference. The process involves preparing a solution of the polymer in an activating liquid and extruding the solution into a region of substantially lower pressure and temperature whereby vaporization of the activating liquid rapidly cools the solution to the temperature at which solid polymer precipitates and freezes in the polymer orientation. A foam sheet particularly preferred in the instant invention consists essentially of isotactic polypropylene, and has a density no greater than about 0.15 g./cc.

The heat shrinkable film can be an oriented polymeric film, for example, those composed of cross linked polyethylene, blends of ethylene polymers, polypropylene, polyvinyl chloride, vinylidene chloride copolymers, rubber hydrochloride and polyesters such as alkylene terephthalate and isophthalate homo-polymers and copolymers. The film can be prepared by any of the usual film forming methods, such as melt extrusion or solvent casting. The film is oriented in at least one direction, the extent and condition of stretching depending on the amount of shrinkage desired in the final product. The film should preferably have a percent shrinkage of at least 15 along each axis of the plane of the film when subjected to a temperature of 100° C., and the film should exhibit a shrinkage tension of at least 150 grams/inch/mil at this temperature. One film which has been found particularly satisfactory in the instant laminates is a blend of ethylene polymers having densities at 25° C. in the ranges of 0.91 to 0.93 and 0.94 to 0.98, and in the proportions of 70-85 percent and 30-15 percent, respectively.

The film and the foam sheet can be bonded together by conventional adhesive techniques known to those skilled in the art. For example, an adhesive can be applied to the surfaces of both the foam sheet and the heat shrinkable film and the resulting coated structures then pressed together and cured. Lamination can also be effected by hot melt lamination techniques.

Adhesives which can be used include hot melt or lacquer adhesive systems, such as ethylene homopolymers and copolymers. A necessary feature of the adhesive is that its adhesive properties be substantially unimpaired throughout the range of heat-shrinking temperatures to which the laminates are subjected. Adhesives which have been found particularly effective in the instant invention are copolymers of ethylene with vinyl acetate or acrylic ester such as ethyl acrylate. In preparation of the laminated structures, care must be taken to avoid subjecting the film to elevated temperatures which would cause premature shrinking of the film. To this end, a chill roll is generally used in conjunction with hot melt adhesives to maintain the film at a relatively low temperature.

The surfaces to be adhered can be treated for adherability by techniques known to those skilled in the art such as electrical discharge, flame or chemical treatment, to insure firm bonding of the composite. However, for some purposes where very strong bonding is not required, adherability treatment of the foam sheet and the film surface may not be necessary.

The heat shrinkable laminar structure is well suited for rapid packaging of fragile items. It has distinct advantages over other cushioning materials by virtue of its low density and toughness coupled with good cushioning performance. The laminates can be used in the form of sleeves or pouches, with either the film surface or the foam sheet surface on the outside, depending on whether a smooth, abrasion-resistant surface on a surface of high coefficient of friction is desired on the interior or exterior of the cushioning structure.

EXAMPLE 1

An isotactic polypropylene foam sheet, approximately one-sixteenth inch thick, is prepared according to the procedure described according to example 1 of the above mentioned Parrish application, Ser. No. 664,781. The resulting foam sheet has a weight of about 0.9 oz./yd.$^2$ and is subjected to electrical discharge treatment substantially as described in U.S. Pat. No. 3,018,189.

A heat shrinkable film is treated with an electrical discharge following the procedure used for treating the foam sheet. The film is made by extruding a bland of 75 percent by weight of a polyethylene resin having a density of 0.915 g./cc. and 25 percent of a polyethylene resin having a density of 0.958 and stretching the extruded film in the machine and transverse directions approximately four times at 100° C. following the procedure described in U.S. Pat. No. 3,299,194, employing the apparatus described in U.S. Pat. No. 3,141,912.

These two materials are fed into the nip formed by a chill roll and a press roll, as illustrated in the figure, while molten polyethylene, discharging from an extruder die held at about 570° F., is deposited on the treated surface of the foam sheet just prior to its entering the nip. On immersion in boiling water the resulting laminate shows a shrinkage of 28 percent in the machine direction and 35 in the transverse direction, compared with values of 30 percent and 37 percent, respectively, for the film before lamination. The laminate shows a shrink force of about 180 grams/inch/mil, the film prior to lamination exhibiting a value of about 200. Sleeves formed of the laminate, about 15 percent oversize, shrink tightly around test bottles and conform well to the configuration of the bottle.

If the example is repeated, using an adhesive layer of an ethylene/vinyl acetate copolymer such as that commercially available from E. I. du Pont de Nemours and Company as "Alathon 6523," a laminate of similar characteristics is obtained.

EXAMPLE 2

The laminating procedure of example 1 is repeated, using a heat shrinkable polyethylene terephthalate film instead of blended polyethylene. The polyethylene terephthalate film is prepared according to the procedure described in U.S. Pat. No. 28,784,456. The adhesive used is an ethylene/vinyl acetate copolymer.

The resulting laminate exhibits excellent heat shrink, and cushioning properties, and the film-foam bond remains firmly intact through heat-shrinking.

EXAMPLE 3

A foam sheet and heat shrinkable film as described in example 1 are subjected to electrical discharge treatment. Thereafter, a polyester adhesive, containing 15 percent by weight of isocyanate curing agent, is applied to the treated surfaces of the film and foam, respectively. The adhesive coated elements are pressed together and cured at room temperature for 24 hours.

The resulting laminar structure is used to form loosely fitting tubes and pouches by sealing film-to-film surfaces together in the appropriate areas. A sample of glass stem wear is inserted in a pouch made in this way and the pouch is thereafter heated to shrink the cushioning material snugly around the object. Delicate china figurines, electronic tubes and light bulbs are similarly wrapped. In each instance, after shrinking, the cushioning material conforms very well to the irregularly shaped objects being packaged.

We claim:

1. A laminar heat shrinkable cushioning structure which comprises
   a. preformed foam sheet of thermoplastic crystalline polymer of film forming molecular weight having a work-to-break value of at least 10,000 in.-lbs./in.$^3$, the foam sheet consisting essentially of polyhedral shaped cells whose median diameter is at least 500 microns and having a maximum density of 0.03 g./cc. and
   b. preformed heat shrinkable thermoplastic film oriented in at least one direction and adhesively bonded to at least one surface of the foam sheet.

2. A structure of claim 1 wherein the heat shrinkable film is a biaxially oriented film of about from 70 percent to 85 percent by weight of ethylene polymer having a density of 0.91 to 0.93 g./cc. at 25° C. and about from 30 percent to 15 percent by weight of ethylene polymer having a density of 0.94 to 0.98 g./cc. at 25° C.

3. A structure of claim 1 wherein the foam has a density of less than about 0.15 g./cc.

4. A structure of claim 1 wherein the foam consists essentially of isotactic polypropylene.

5. A structure of claim 1 wherein the foam and film are bonded together with adhesive selected from ethylene polymers and copolymers.

6. A structure of claim 5 wherein the adhesive is an ethylene/vinyl acetate copolymer.

7. A structure of claim 5 wherein the adhesive is an ethylene/ethyl acrylate copolymer.